US012076762B2

(12) United States Patent
Phillips et al.

(10) Patent No.: US 12,076,762 B2
(45) Date of Patent: Sep. 3, 2024

(54) METHOD AND APPARATUS FOR ULTRASONICALLY CLEANING INDUSTRIAL COMPONENTS

(75) Inventors: William Lash Phillips, Medicine Hat (CA); Shawn Smith, Fort McMurray (CA); Byron Kieser, Beeton (CA)

(73) Assignee: TECH SONIC LIMITED PARTNERSHIP, St. Albert (CA)

( * ) Notice: Subject to any disclaimer, the term of this patent is extended or adjusted under 35 U.S.C. 154(b) by 218 days.

(21) Appl. No.: 13/518,248

(22) PCT Filed: Dec. 22, 2010

(86) PCT No.: PCT/CA2010/002016

§ 371 (c)(1), (2), (4) Date: Aug. 23, 2012

(87) PCT Pub. No.: WO2011/075831

PCT Pub. Date: Jun. 30, 2011

(65) Prior Publication Data

US 2014/0230844 A1 Aug. 21, 2014

Related U.S. Application Data

(60) Provisional application No. 61/289,050, filed on Dec. 22, 2009.

(51) Int. Cl.
*B08B 3/12* (2006.01)

(52) U.S. Cl.
CPC .................................... *B08B 3/12* (2013.01)

(58) Field of Classification Search
CPC ........................................................ B08B 3/12
See application file for complete search history.

(56) References Cited

U.S. PATENT DOCUMENTS

| | | | | |
|---|---|---|---|---|
| 2,900,038 | A * | 8/1959 | Jacke | B08B 3/12 310/341 |
| 3,702,795 | A | 11/1972 | Wessells et al. | |
| 5,143,103 | A * | 9/1992 | Basso et al. | 134/98.1 |
| 5,200,666 | A | 4/1993 | Walter et al. | |
| 5,289,838 | A | 3/1994 | Odell | |

(Continued)

FOREIGN PATENT DOCUMENTS

| | | | |
|---|---|---|---|
| CA | 2369950 | A1 | 10/2000 |
| CA | 2378932 | | 1/2001 |

(Continued)

OTHER PUBLICATIONS https://www.researchgate.net/publication/336220952 (Year: 2013).*

(Continued)

*Primary Examiner* — Joseph L. Perrin
*Assistant Examiner* — Irina Graf
(74) *Attorney, Agent, or Firm* — Finch & Maloney PLLC

(57) ABSTRACT

An apparatus for cleaning industrial components which has a liquid container defining a liquid enclosure for containing a cleaning liquid and ultrasonic transducers having an operating frequency and a wavelength in the cleaning liquid and secured to at least a portion of the liquid container at a spacing of between 2 and 10 wavelengths. During operation, the transducers generate a larger power density in the component-receiving area of the liquid container than an average power density of the liquid container.

8 Claims, 10 Drawing Sheets

(56) References Cited

U.S. PATENT DOCUMENTS

| | | | |
|---|---|---|---|
| 5,337,446 A | 8/1994 | Smith et al. | |
| 5,865,199 A | 2/1999 | Pedziwiatr et al. | |
| 6,021,791 A | 1/2000 | Dryer et al. | |
| 6,019,852 A * | 2/2000 | Pedziwiatr | B08B 3/12 134/1 |
| 6,145,518 A | 11/2000 | Huffman | |
| 6,276,370 B1 * | 8/2001 | Fisch | B08B 3/12 134/1.3 |
| 6,290,778 B1 | 9/2001 | Zugibe | |
| 6,396,892 B1 | 5/2002 | Frattini et al. | |
| 6,572,709 B1 * | 6/2003 | Kaneda et al. | 134/1 |
| 6,615,852 B1 * | 9/2003 | Kitahara | 134/111 |
| 6,857,436 B2 | 2/2005 | Labib et al. | |
| 6,929,701 B1 | 8/2005 | Patel et al. | |
| 7,025,811 B2 | 4/2006 | Streichsbier et al. | |
| 7,247,977 B2 | 7/2007 | Goodson | |
| 7,357,829 B2 | 4/2008 | Ehlers | |
| 7,542,539 B2 | 6/2009 | Frattini et al. | |
| 2004/0168706 A1 * | 9/2004 | Boyd | H01L 21/67057 134/1.3 |
| 2005/0011357 A1 | 1/2005 | Crawley | |
| 2005/0122003 A1 | 6/2005 | Goodson | |
| 2007/0006892 A1 * | 1/2007 | Olesen et al. | 134/1 |
| 2009/0241985 A1 | 10/2009 | Gross et al. | |
| 2011/0132575 A1 | 6/2011 | Goodson | |
| 2018/0238646 A1 | 8/2018 | Baxter et al. | |

FOREIGN PATENT DOCUMENTS

| | | | |
|---|---|---|---|
| CA | 2359149 | A1 | 4/2003 |
| CA | 2412432 | | 5/2004 |
| CA | 2413899 | C1 | 6/2004 |
| CA | 2544633 | | 5/2005 |
| CN | 1355923 | A | 6/2002 |
| CN | 101084586 | A | 12/2007 |
| JP | 53103662 | S | 9/1978 |
| JP | 6254521 | | 9/1994 |
| JP | 07171526 | H | 7/1995 |
| JP | 08089916 | H | 4/1996 |
| JP | 9024349 | | 1/1997 |
| JP | H10137705 | A | 5/1998 |
| JP | 11188324 | H | 7/1999 |
| JP | 2000162789 | A | 6/2000 |
| JP | 2002299300 | A | 10/2002 |
| JP | 2002541495 | A | 12/2002 |
| JP | 2003504204 | A | 2/2003 |
| JP | 2004504868 | A | 2/2004 |
| JP | 2007523738 | A | 8/2007 |
| JP | 2007301538 | A | 11/2007 |
| RU | 3704 | U1 | 3/1997 |
| RU | 70169 | U1 | 1/2008 |
| WO | 9936197 | A1 | 7/1999 |
| WO | 0062304 | A1 | 10/2000 |
| WO | 01/06196 | A1 | 1/2001 |
| WO | 2005044440 | A2 | 5/2005 |
| WO | 2009/135273 | A1 | 11/2009 |

OTHER PUBLICATIONS

Kohli, Rajiv, and K. L. Mittal. "Developments in Surface Contamination and Cleaning Fundamentals and Applied Aspects" vol. 2, Ch. 6, Elsevier (Year: 2010).* https://crest-ultrasonics.com/push-pull-piezo-transducer/ (Year: 2021).*

Martin Walter Push-Pull Transducers Product Specifications (http://web.archive.org/web/20031116121003/http://www.crest-ultrasonics.com/Crest%20PDFs/MW_AlloySpecs.pdf) (Year: 2003).*

"Understanding Ultrasonic Power Requirements Based on Tank Size and Other Factors" (https://techblog.ctgclean.com/wp-content/uploads/Considerations-for-Ultrasonic-Power-Density-vs.-Tank-Volume1.pdf) (Year: 2021).*

Russian Office Action issued in corresponding Russian Application No. 2012130930/05 mailed on Jul. 15, 2011. [9 pages].

European Search Report issued in corresponding European Application No. 10838464.5 mailed Jun. 10, 2014.

Fino, D. et al. "Diesel Particulate Traps Regenerated by Catalytic Combustion". Korean J. Chem. Eng., 20(3), 445-450, 2003.

Chinese Office Action issued in corresponding Chinese Application No. 201080064577.9 mailed on Feb. 25, 2014.

* cited by examiner

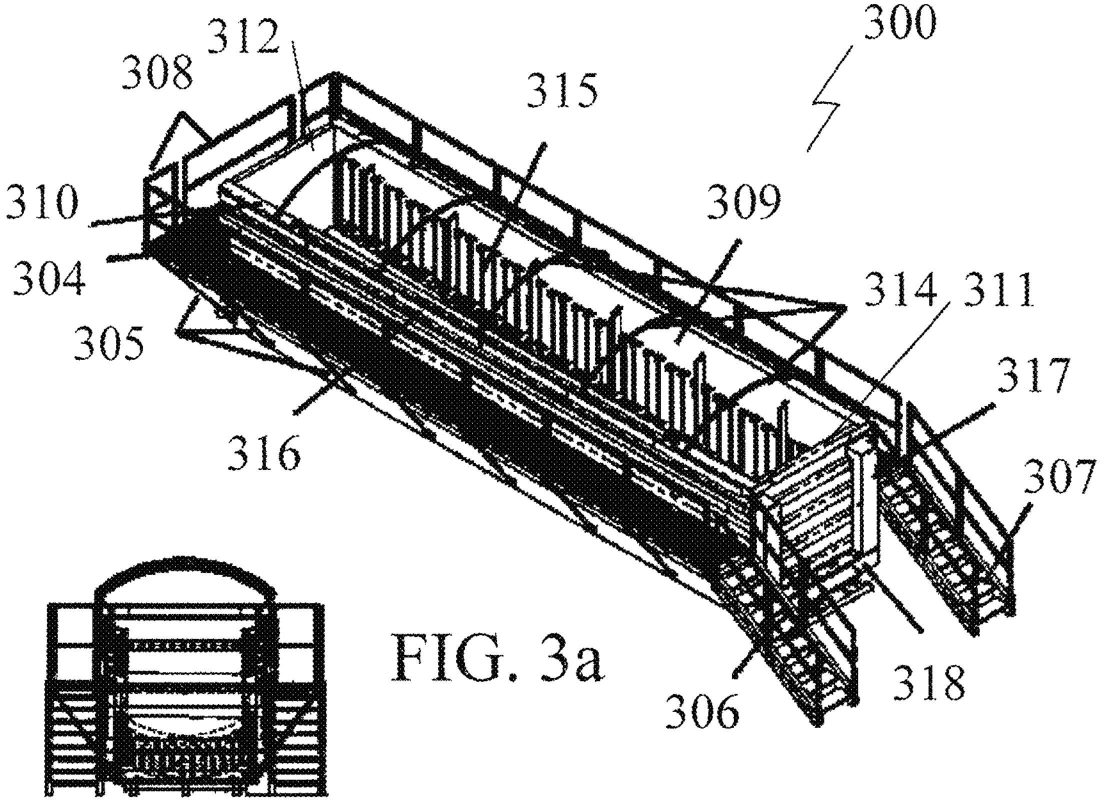
FIG. 3a
FIG. 3b
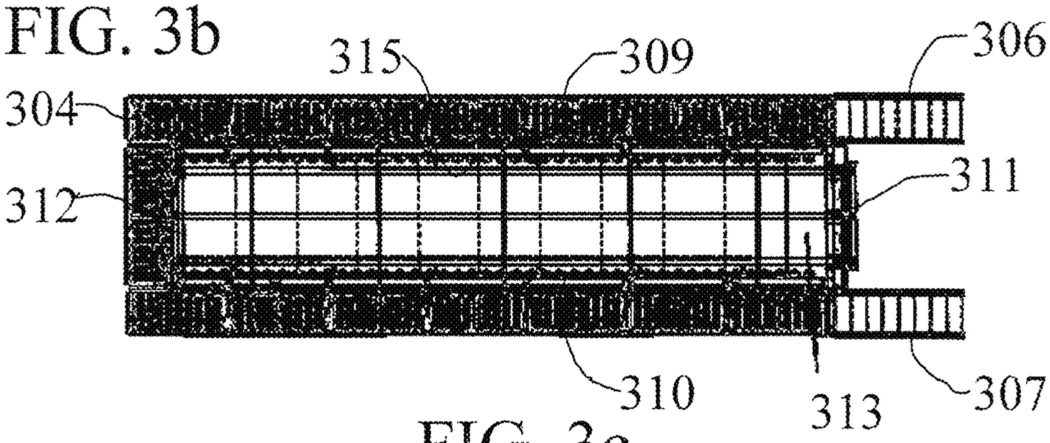
FIG. 3c
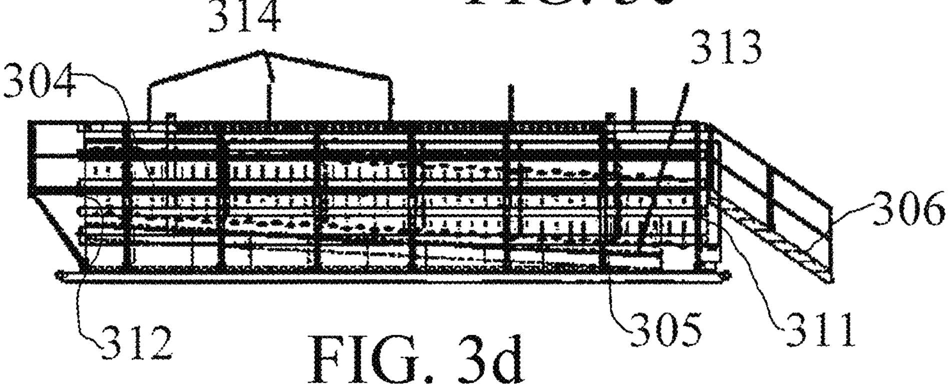
FIG. 3d

METHOD AND APPARATUS FOR ULTRASONICALLY CLEANING INDUSTRIAL COMPONENTS

FIELD

This relates to a method and apparatus for cleaning industrial components, particularly heat exchangers.

BACKGROUND

Heat exchangers and other industrial components, such as pipe spools, valves, fittings, pipe sections, etc. become fouled during operation and require periodic cleaning. The types of components that become fouled will vary depending on the industry. Cleaning is important because the operational efficiency of these components depends on the surfaces being clean and free of contamination to allow proper heat exchange, flow, velocity, mixing, control to occur during an industrial process.

Traditional methods for cleaning industrial components of the type described herein have involved the use of high pressure water to mechanically dislodge and wash contaminants, chemical rinse or soak to dissolve contaminants, mechanical (abrasive) cleaning or a combination of all three.

Heat exchangers are used to effect the exchange of heat energy between two media. In some cases this exchange may be for the purposes of cooling a process fluid, and in other cases it may be to increase the temperature of a fluid. In most cases the media are separated by a material through which the heat must pass, typically a metal tube of some sort. A very common type of heat exchanger is the "shell and tube" design, in which one media flows through a complex arrangement, or "bundle" of tubes inside a larger shell through which a second media flows, by a tortuous path, through the tube bundle. Examples of typical shell and tube heat exchangers are shown in FIGS. 1*a* and 1*b*, which serve to demonstrate the complexity of such a device. Heat exchangers, represented by reference numeral 102 in FIG. 1*a* and 103 in FIG. 1*b*, contain exchanger tubes 106 that generally have a straight tube exchanger bundle (shown partly extracted from the shell) or a bent "U tube" design. In FIG. 1*a*, there is a bent or "U" tube 102 design and in FIG. 1*b*, there is the more common straight tube 103 design. The shell 104 serves as the conduit for one of the media via a tortuous path, directed by baffles 105 through the tube bundle 102 or 103 in which the media contacts the outer diameter 107 of the exchanger tubes 106. The tube sheet 108 serves to hold the tubes 106 in a specific arrangement as a bundle, and to separate the two media (between the shell and the tubes) and allow the $2^{nd}$ media to pass through the inner diameter of the heat exchanger tubes. In service, both the inner and outer diameters of the tubes comprising the bundle may become fouled with contaminants such that the flow rate through the tubes, and/or the heat transfer properties of the tubes are negatively affected, resulting in a loss of efficiency in the overall process. There are many other types of heat exchanger designs, including plate exchangers, in which two or more fluid media are separated by thin metal plates, arranged in closely spaced stacks such that alternate spaces are filled with alternate media. The plate exchanger design provides a large surface area for contact between the media but is particularly difficult to clean owing to the compactness of the exchanger, the fact that it cannot typically be disassembled, and the small fraction of the plate surface accessible for traditional mechanical cleaning methods.

Similarly, tube sections, pipe spools, valves and other components both upstream and downstream of the heat exchanger may become fouled to the extent that the efficiency of the overall process is reduced, and these components typically require cleaning on a schedule similar to that of the heat exchangers that they are in line with. Other industrial components in systems that don't include heat exchangers may also become fouled and require cleaning.

The composition of the fouling is determined by the media and the conditions (temperature, pressure, velocity, surface properties, etc.) present in the process media. For example, in the oil and gas industry, heavy crude oil presents bitumen and asphaltene foulants, which can severely restrict and in some cases entirely block tubes, valves and heat exchangers. In the chemical industry, polymer or partially polymerized contaminants are common and in the food industry, heavy fats, caramelized sugars and microbial contaminants are often seen. Hard scaling, derived from cooling water is also seen across all industries where water is used as a cooling media.

Cleaning fouled industrial components has most commonly been done using high pressure water jetting (blasting). This technique involves using high pressure pumps, both hand-held and automated, at between 15,000-50,000 psi, to deliver a variety of water streams to the contaminated part to dislodge the contaminant material. This technique has limited success on complicated surfaces not only because of the lack of solubility of many of the contaminants and the concreted nature of the contamination, but also the complexity of the tube bundle, exchanger plates, valve part or tube section, which makes direct impact to much of the surface to be cleaned by the water jet impossible. The water blasting technique is also quite dangerous, requiring the operator to wear armour, and resulting in thousands of workplace injuries in North America each year, including fatalities. Furthermore, the high pressure water jetting methods are very time consuming. A single heat exchanger may require up to a week of continuous, 24 hours per day blasting, with a 3 man crew of operators to remove the bulk of the fouling.

Chemical cleaning of industrial components such as heat exchangers, tubes and valves may also be done using a chemical rinse strategy in which the process fluid is substituted for a chemical designed to dissolve contaminants. This methodology requires often large volumes of hazardous chemicals and often fails to remove the contamination completely due to the complicated liquid flow patterns within the system or due to plugged tubes—through which no chemical rinse can flow.

Purely mechanical cleaning methods using abrasives (such as sand blasting) are typically used in only the most extreme cases, partly because these techniques suffer from some of the same risks and deficiencies as high pressure water jetting, but also because of the potential surface impacts (damage) to the materials of the parts being cleaned.

Another option for cleaning components is with the use of ultrasonic energy, such as described in Canadian Patent No. 2,412,432 (Knox) entitled "Ultrasonic Cleaning Tank" which describes a tank in which industrial components are cleaned with the aid of ultrasonic energy.

SUMMARY

There is provided an apparatus comprised of a vessel, to which ultrasonic transducers are secured in such a way as to direct ultrasonic energy, which, when combined with a suitable cleaning fluid, may be used to clean industrial components, such as heat exchangers, contained within the vessel. The ratio of ultrasonic transducers to liquid volume provides a nominal energy density in the vessel of between 5 and 25 watts per gallon, however the arrangement (spacing) and operation (power and type) of the transducers provides non-uniform energy densities in and about the objects to be cleaned of greater than 20 watts per gallon in certain locations. The spacing of the transducers at between 2 and 10 wavelengths distance within the container is designed to provide a uniform energy field, which maintains higher than nominal energy density within the vessel in the volume in which the component to be cleaned is housed.

There is provided an apparatus comprised of a vessel, to which ultrasonic transducers are secured in such a way as to direct ultrasonic energy, at frequencies between 20 kHz and 30 kHz, which, when combined with a suitable cleaning fluid, may be used to clean industrial components, especially heat exchangers, contained within the vessel. The frequency of the transducers may be operated between 20-30 kHz which provides wavelengths of ultrasonic energy suitable for cleaning industrial scale components, such as heat exchangers.

The transducers used in one example of the apparatus deliver 2000 watts of energy each, at a nominal centre frequency of 25 kHz, by use of a "push pull" design, such as those described in U.S. Pat. No. 5,200,666 (Walter et al.) entitled "Ultrasonic Transducer", in which a metal rod is caused to resonate by the application of ultrasonic energy at both ends of the rod, through the expansion and contraction of piezoelectric crystal elements stacked inside a transducer or converter device attached to each end of the rod. The vibrations created by the longitudinal expansion and contraction of the piezoelectric elements, sometimes referred to as thickness mode, are primarily expressed by the resonant rod as radial vibrations (relative to the axis of the rod) by ensuring that the rod length is correctly tuned to the resonant frequency of the transducer elements, which operate synchronously and are attached to each end of the rod.

Because of the radial radiation of ultrasonic energy from the rod transducers used in the example described above, spacing of the transducers is important to ensure a uniform energy field in the container. Normally, the energy transmitted from the transducer radially decreases (attenuates) in proportion to the square of the distance from the transducer. To prevent this, transducers are spaced at integral wavelength distances of between 2 and 10 wavelengths, typically between 4 and 24 inches in the preferred frequency range. This arrangement creates an acoustic approximation of a planar transducer at distances from the transducers of approximately 5-10 wavelengths, and provides a much more uniform energy density in the volume in which an object is to be cleaned. The power density in the container may be calculated as the total output of all transducers in the liquid container in Watts divided by the volume of the container in U.S. Gallons. Preferably, when the container 500 is full of cleaning fluid to the minimum liquid level, provides between 10-60 Watts/gallon. The power density may also be calculated for specific volumes of the container, such as around the component to be cleaned.

According to another aspect, the transducers may be powered by suitable electronic generators which deliver electrical energy in a form suitable to cause the transducers to resonate between 20 kHz and 30 kHz, with a typical centre frequency of 25 kHz, a to dissipate between 500 and 3000 Watts per individual resonating rod transducer, or up to 60000 Watts for immersible plate style transducers.

According to another aspect, the transducers may operate at a nominal frequency (e.g. 25 kHz) which is controlled by the electronic generators, and the frequency of the transducers are allowed to fluctuate about the nominal frequency in order to maintain maximum power output, and may be fluctuated intentionally to prevent cavitation damage to equipment by standing waves. In some circumstances, it may be preferred to avoid any control of the phase of sound waves between adjacent transducers, such that transducers are allowed to operate at slightly different and variable frequencies. In at least some circumstances, the effect of the varying frequencies creates a dynamic energy field, which enhances cleaning action and at the same time reduces the potential for damage to components by static standing waves of high energy.

According to another aspect, there is provided an appropriate cleaning fluid based on a proper assessment of the contaminants fouling the components to be cleaned is necessary. For asphaltenes, bitumen and other heavy crude oil derivatives, it has been found that an aqueous based degreasing solution, with near neutral pH, such as Paratene D-728 produced by Woodrising Resources Ltd. of Calgary, Alberta provides excellent performance, and relatively simple disposal. In some cases small amounts of solvent may be added to the aqueous solution to enhance the removal of certain contaminants. In some other cases, it is necessary to use strongly acidic or basic cleaning fluids to address specific contaminants, such as polymers, epoxies, scales, etc. The choice of materials in construction of the container is therefore important and it has been discovered that while normal (or "carbon") steels perform well as structural elements, and as container walls in strictly near neutral applications, stainless steel is preferred as a wall material to avoid corrosion in the case of non-neutral cleaning fluids. Other construction materials may also be used based on the anticipated cleaning fluid and contaminants as will be recognized by those skilled in the art.

According to another aspect, the liquid container may be formed by the shell or modified shell of an existing heat exchanger.

There is therefore provided, according to an aspect, an apparatus for cleaning industrial components, comprising a liquid container defining a liquid enclosure for containing a cleaning liquid; and ultrasonic transducers having an operating frequency and a wavelength in the cleaning liquid and secured to at least a portion of the liquid container at a spacing of between 2 and 10 wavelengths. In operation, the ultrasonic transducers generate a larger power density in the component-receiving area of the liquid container than an average power density of the liquid container.

According another aspect, there is provided a method of cleaning industrial components, comprising the steps of: securing ultrasonic transducers to at least a portion of a liquid container at a spacing of between 2 and 10 wavelengths based on the operating frequency and wavelength of the ultrasonic transducers in a cleaning liquid; introducing the cleaning liquid into the liquid container such that a minimum liquid level is reached and all ultrasonic transducers are submerged in the cleaning liquid; introducing an industrial component into the cleaning liquid; and operating the ultrasonic transducers to generate a larger power density in the component-receiving area of the liquid container than an average power density of the liquid container.

According to another aspect, the transducers may generate a frequency between 20 kHz and 30 kHz, and may generate frequencies about the centre frequency of 25 kHz. At least some of the transducers simultaneously may generate different frequencies between 20 kHz and 30 kHz. At least some of the transducers may be out of phase According to another aspect, the transducers may be secured to an inner surface of the liquid container, or an outer surface of the liquid container. The transducers may be plate-type transducers, or resonating rod transducers. The resonating rod transducers may comprise one or two active ultrasonic heads. The transducers may generate a power density within the liquid container when filled with liquid of between 10-60 Watts/gallon. The transducers may be mounted vertically, horizontally and/or diagonally to the inner surface of the liquid container. The transducers may be mounted using a compliant clamping at a top of the transducer, and a mount device that does not restrict motion along the axis of the resonant rod.

According to an aspect, the container may be a liquid tank having an open top. The container may have a removable or retractable top cover. The container may be sufficiently large to receive a set of heat exchanger tubes that may be between 2 feet and 150 feet in length and between 6 inches and 12 feet in diameter. The bottom of the liquid container may be flat, concave, or "V" shaped.

According to an aspect, the liquid container may be an outer shell containing a set of exchanger tubes.

According to an aspect, the liquid container may comprise an aqueous based degreasing surfactant solution having a pH between 7-11, an aqueous cleaning solution comprising at least one of solvent additives, an acid solution and an alkaline solution, an aqueous cleaning solution comprising an acid solution, or an aqueous cleaning solution comprising an alkaline solution.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 3*a* is a perspective view of an apparatus for cleaning industrial components that is designed to clean 5'×30' heat exchanger.

FIG. 3*b* is an end elevation view in section of the apparatus shown in FIG. 3*a*.

FIG. 3*c* is a top plan view of the apparatus shown in FIG. 3*a*.

FIG. 3*d* is a side elevation view of the apparatus shown in FIG. 3*a*.

DETAILED DESCRIPTION

Ultrasonic cleaning employs the use of ultrasonic sound waves to disrupt the normal liquid diffusion layer about a surface to drastically increase the rate of reaction (interaction) between a surface contaminant and the cleaning fluid. In addition, cavitation created in the liquid, near the surface, by the compression and rarefaction induced by the incident sound waves, creates high pressure and high temperature microjets, which aid in physically disturbing contaminants at the surface and dislodging them into the cleaning liquid.

By combining ultrasonics with a suitable cleaning liquid, for example a near neutral pH, water based surfactant solution/degreaser, components may be cleaned effectively in a fraction of the time required by traditional methods described above.

The present discussion relates to an improvement on ultrasonic cleaning tanks, which increases the effectiveness and broadens the situations in which they can be used, including use on larger or more complex industrial components.

In particular, the ultrasonic transducers used in association with the cleaning tank are placed relatively close together, such as between 2 to 10 wavelengths apart, or between 2 to 6 wavelengths apart, or between 6 and 10 wavelengths apart. This causes the ultrasonic waves generated by transducers to interfere with each other. It has been found that, by doing so, the gradient of the power density resulting from the ultrasonic waves in the cleaning tank may be modified, such that the penetration of the ultrasonic waves through the tank is increased. Once the principles described herein are understood, a person of ordinary skill will understand the relationship between the ultrasonic waves generated by the transducers and the power density induced in the cleaning liquid by these waves. The transducers are operated such that the frequency and phase of adjacent transducers are not controlled simultaneously, which prevents the formation of static and possibly damaging standing waves in the cleaning liquid.

Figure 1A:
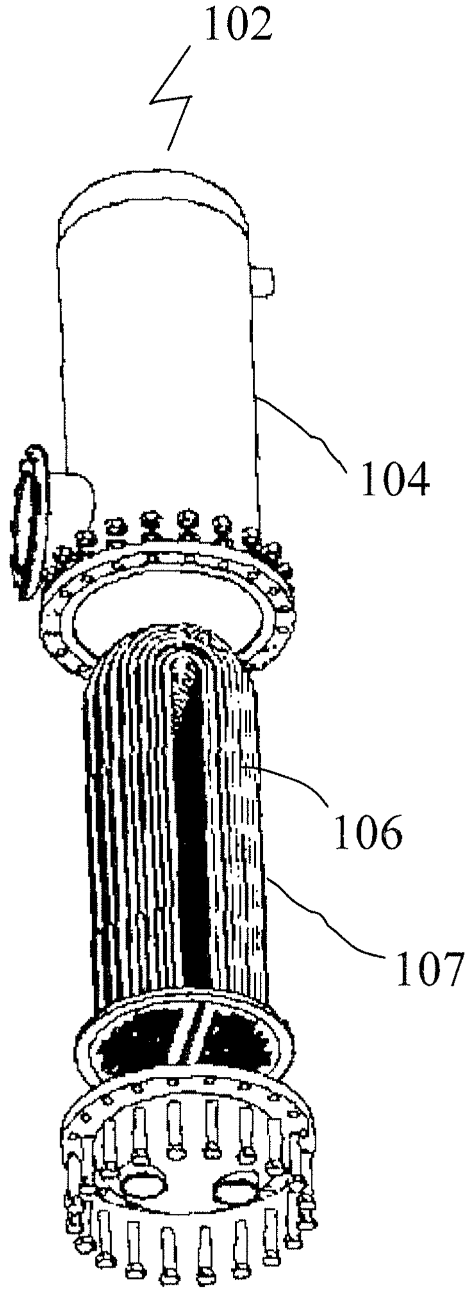
FIG. 1*a* is an exploded perspective view of a typical tube and shell heat exchanger, showing the tube bundle and shell.
Figure 1B:
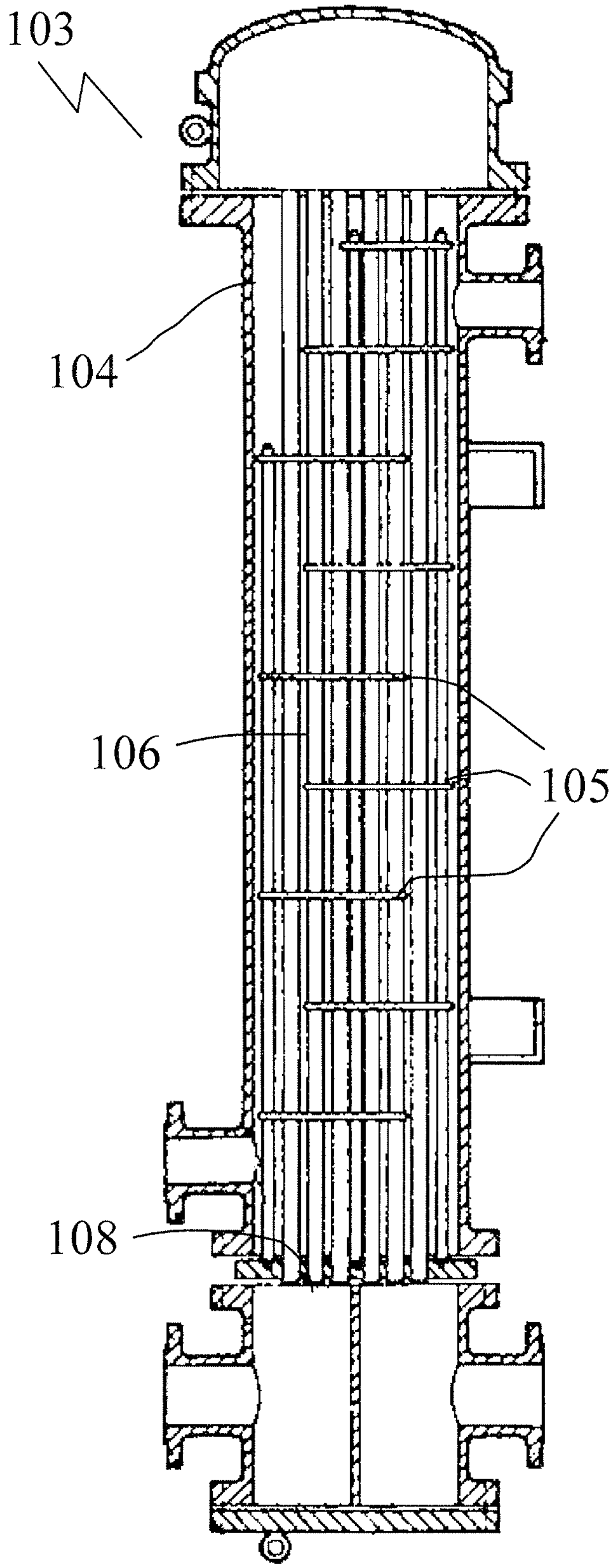
FIG. 1*b* is a side view in section of the tube and shell heat exchanger shown in FIG. 1*a*.
Figure 2:
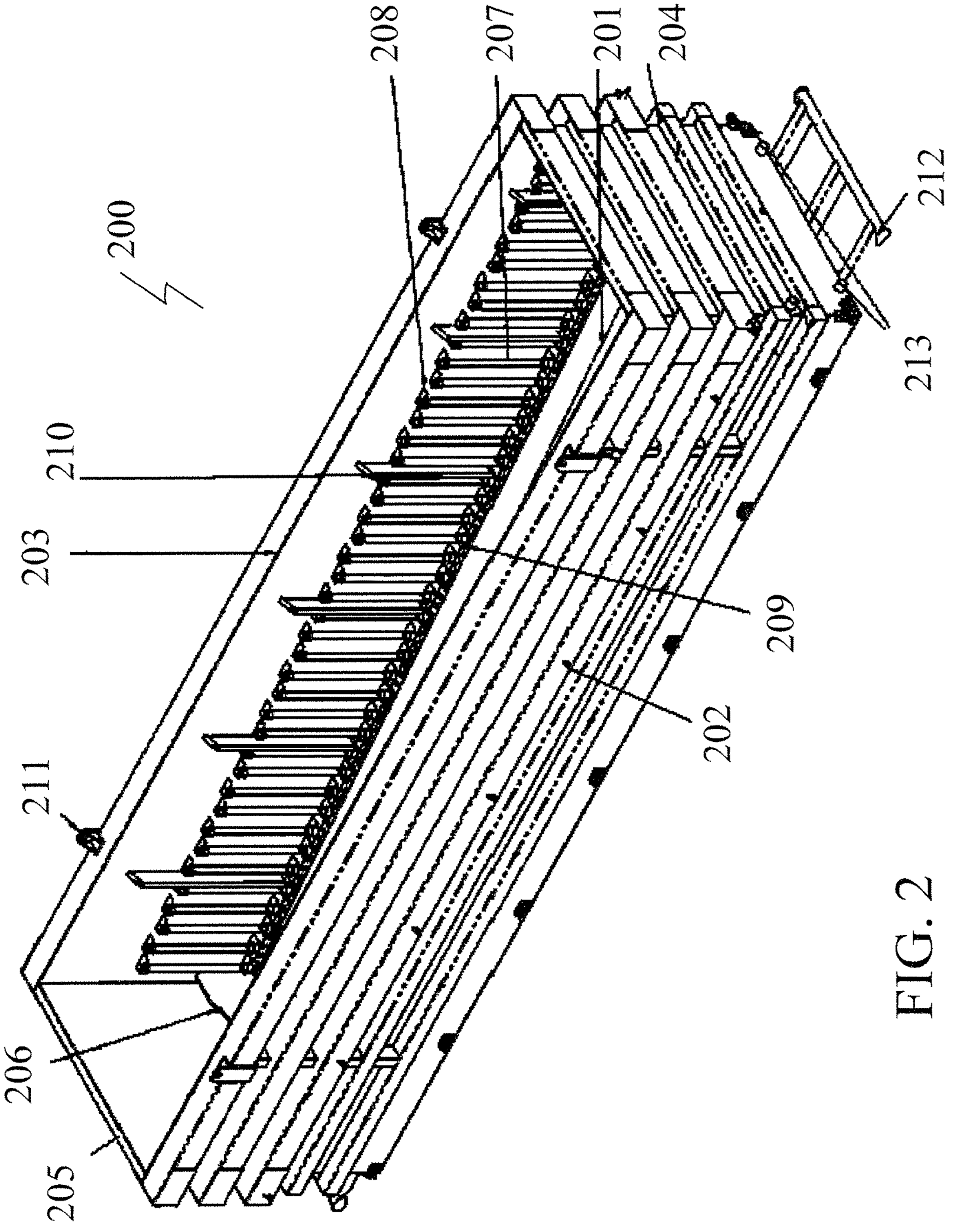
FIG. 2 is a perspective view of an apparatus for cleaning industrial components.

Referring to FIG. 2, there is shown a container 200 having side walls 202 and 203, end walls 204 and 205, a sloped and curved bottom plate 201, and an end baffle 206 to support immersed parts and prevent them from sliding into the end wall 205. The container 200 is constructed using appropriate structural design practices for vessels which will contain liquids, and typically will include structural elements such as vertical and horizontal stiffening beams, support plates, etc., which are not detailed here but will be understood by those skilled in the art and familiar with this type of container design. The inside of side walls 202 and 203 of the container 200 are fitted with ultrasonic transducers 207, mounted using top mounts 208 and bottom mounts 209 such that the transducers are approximately 4 wavelengths apart (e.g. 10" centers). The mounting height of the transducers preferably follows the slope of the bottom plate 201 so as to maintain proximity to long objects placed in the container 200 that rest on the bottom plate 201. Guard bars 210 are positioned between transducers 207 to prevent accidental damage to the transducers 207 from contact by large components in the tank. The container 200 is preferably fitted with lifting lugs 211 to facilitate movement of the container 200, and to facilitate slings used to support objects suspended in the container 200 for cleaning. Drain ports 213 may be included to facilitate removal of cleaning fluid. A skid assembly 212 may be integrated into the design to facilitate movement of the container 200 on the ground and from tilting transport vehicles.

FIG. 3*a*-3*d* show an example apparatus, generally indicated by reference numeral 300 in FIG. 3*a*, that is built for cleaning heat exchangers and other components up to 5 feet in diameter and 30 feet in length. In addition to the features outlined in other examples, this example is constructed with catwalks 304 supported by struts 305, fitted with handrails 308 and accesses by stairways 306 & 307. These components may be included to improve the safety of workers, and for ease of use. In addition to the sidewalls 309 & 310, the end walls 311 & 312 and the sloped bottom 313, the container may also be fitted with supports 314 that permit the fixing of a hard or flexible cover over the container. The cover is used to help maintain the temperature in the liquid container, if it is heated. It may also be used to prevent evaporative losses. Electrical cables from the transducers 315 are preferably gathered in cable runs 316, 317 and 318 where they will exit the container and be connected to the electrical amplifiers (generators) providing the signal to the ultrasonic transducers.

Figure 4A:
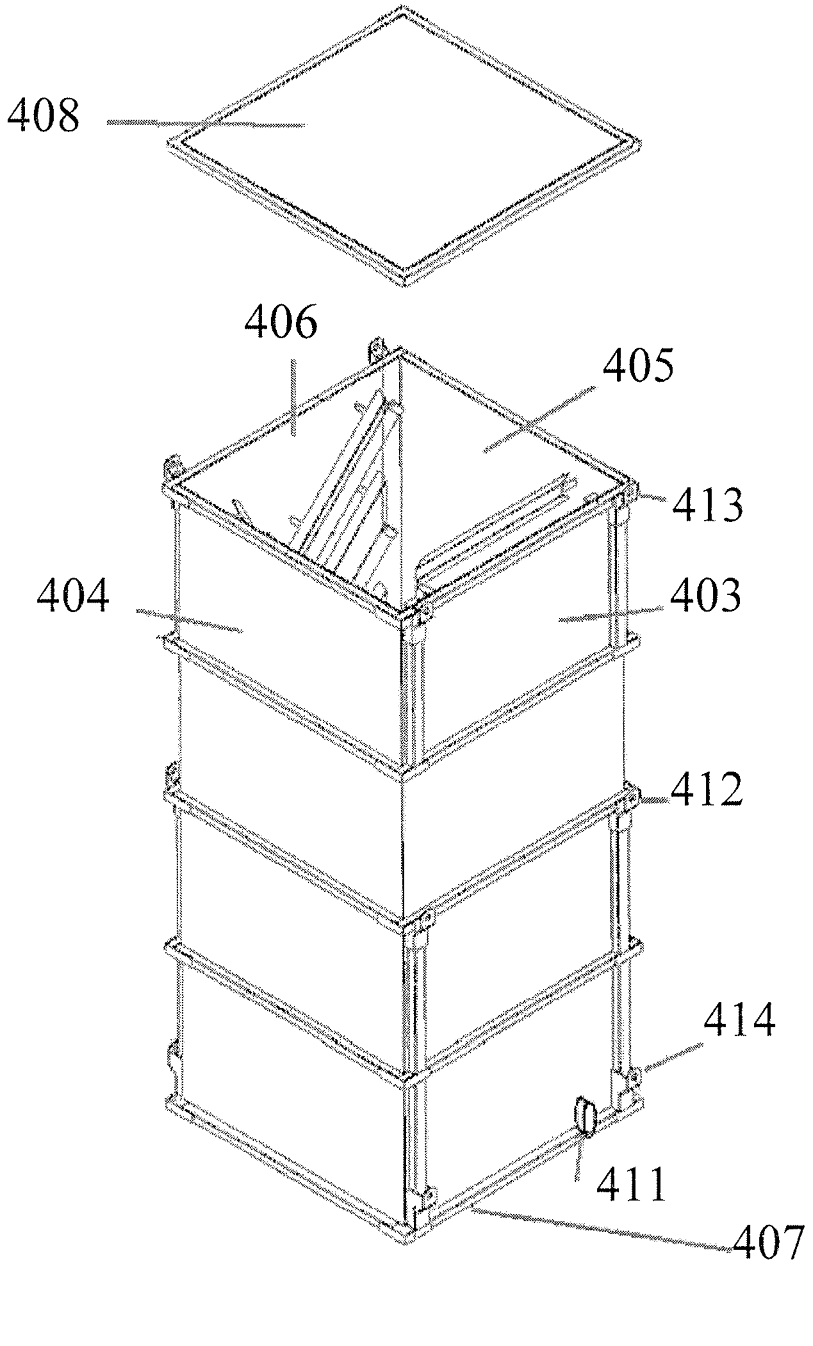
FIG. 4*a* is a perspective view of an alternative apparatus for cleaning industrial components having a vertically-oriented tank.
Figure 4B:
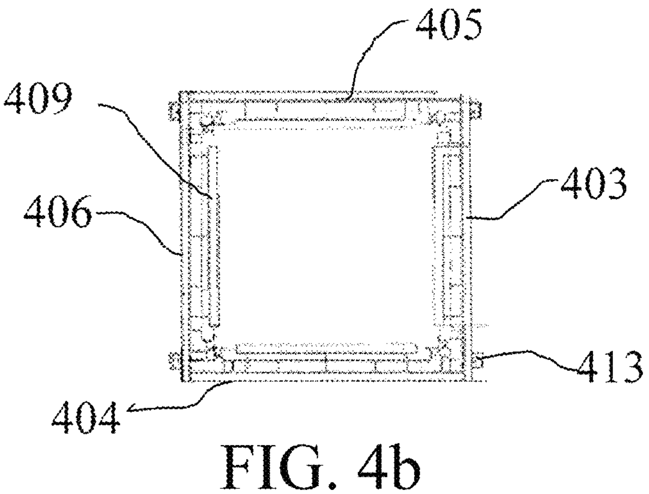
FIG. 4*b* is a top plan view in section of the alternative apparatus shown in FIG. 4*a*.
Figure 4C:
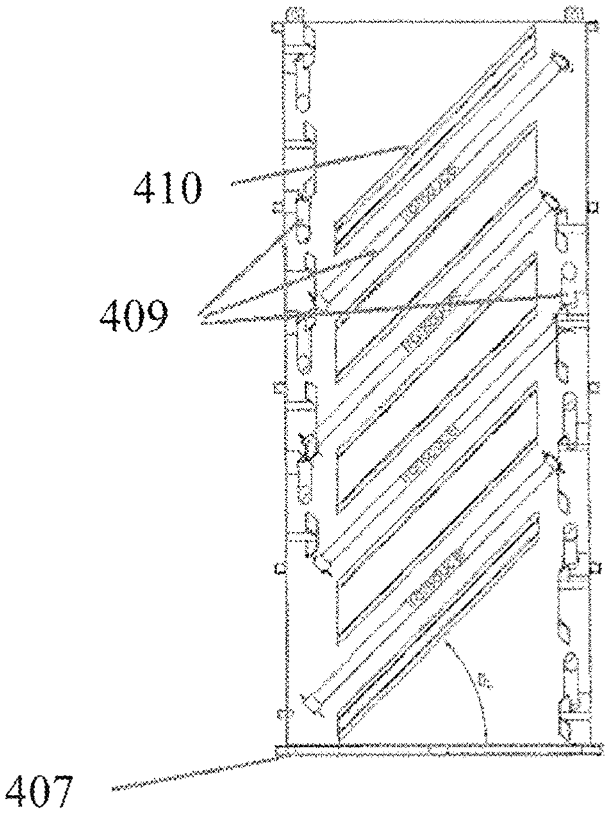
FIG. 4*c* is a side elevation view in section of the alternative apparatus shown in FIG. 4*a*.

FIG. 4*a*-4*c* show an alternate vertical example of the apparatus, which was constructed to accommodate immersion of heat exchangers and pipe sections such that debris from the parts would readily fall to the bottom of the container and could be easily pumped out or drained, and other types of components that would benefit from a vertically oriented tank. This container is constructed of four side walls 403, 404, 405, 406 and a bottom plate 407 and a removable top cover 408. Transducers 409 are shown as being mounted at a 45 degree angle, approximately 10 wavelengths apart (approximately 24") and separated by guards 410, which prevent any accidental damage to the transducers by contact from components being cleaned while in the tank and during immersion or removal. A drain port 411 is provided for convenient removal of the cleaning fluid or lower layer of debris and contamination. Lifting lugs 412, 413 & 414 are provided to facilitate removal and support of the tank during operation.

Figure 5A:
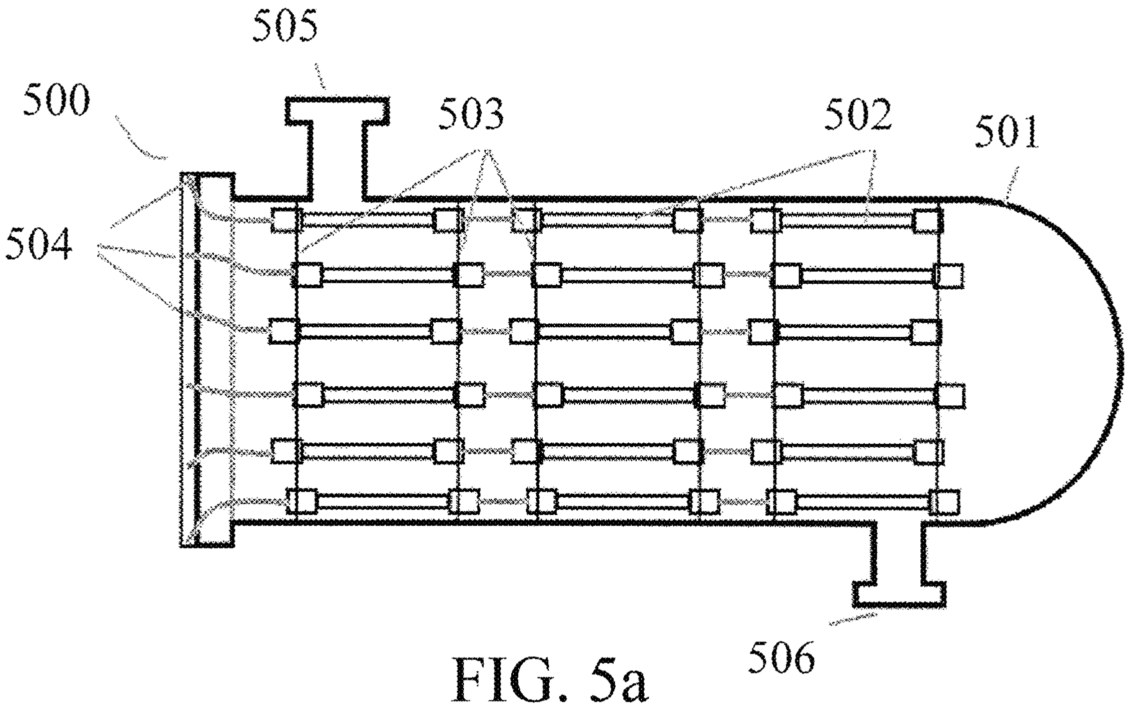
FIG. 5*a* is a side elevation view in section of an apparatus for cleaning exchanger tubes constructed from the shell of the heat exchanger.
Figure 5B:
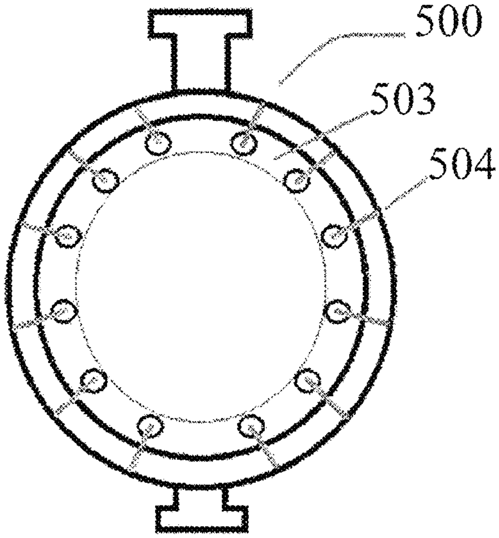
FIG. 5*b* is an end elevation view of the apparatus shown in FIG. 5*a*.

FIGS. 5*a* and 5*b* show an alternate example of the apparatus, in which the container is formed by the shell of the heat exchanger itself, and transducers are mounted within the shell. In this example, the shell 501 forms the cleaning container being comprised of side walls in the form of a pressure vessel tube. Transducers 502 are mounted inside the shell by any convenient method, in this case through the use of baffles 503, which hold the transducers 502 in place, to provide the ultrasonic energy for cleaning of the exchanger bundle (not depicted) in-situ, that is, without the need for removing the bundle from the shell 501. The baffles 503 are designed to work with the baffles of the tube bundle to promote a tortuous path of liquid flow during operation from the inlet 505 to the outlet 506. An intrinsically safe interface at a plate added to the shell manifold 504 is preferably provided for the wiring used to transmit the electrical energy to the transducers 502. Transducers 502 used in this configuration are of a commercially available intrinsically safe type, being filled with an inert, non-conductive fluid. As depicted, the transducers 502 are horizontally-mounted rod-type transducers. However, plate-type transducers externally bonded to the shell, or immersible transducers otherwise supported within the shell may also be used, as will be understood by those skilled in the art.

Figure 6A:
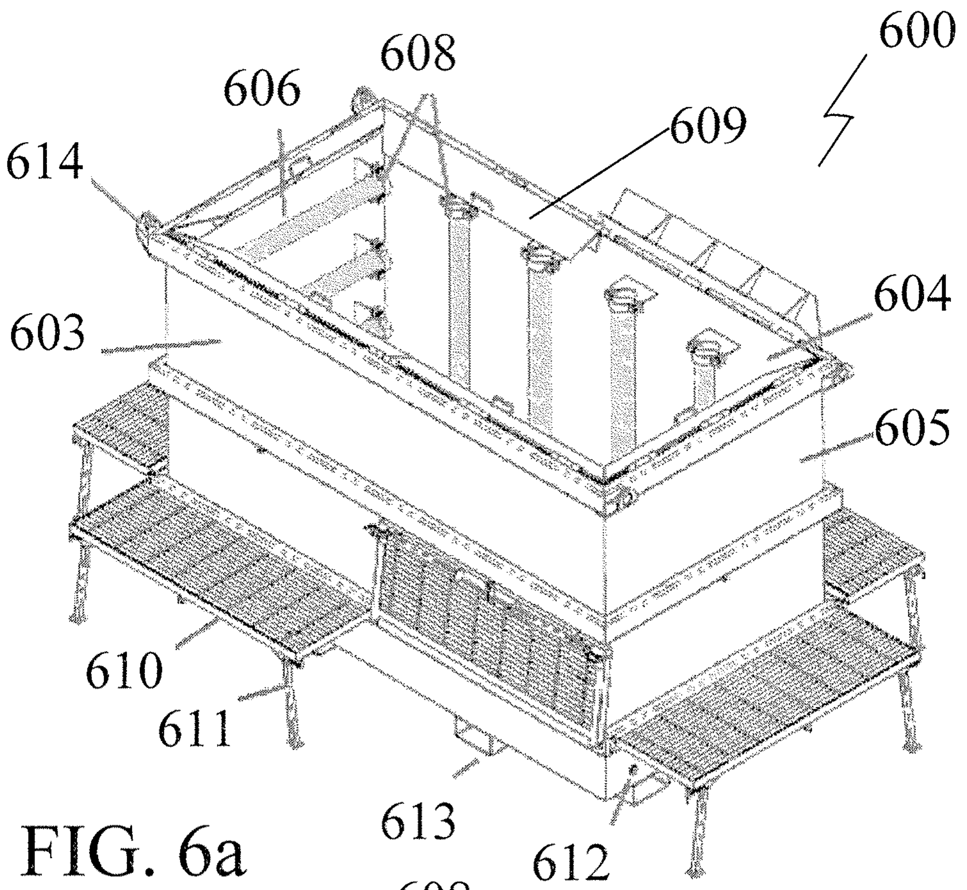
FIG. 6*a* is a perspective view of an alternative apparatus for cleaning industrial components that is designed to clean smaller heat exchangers and valves.
Figure 6B:
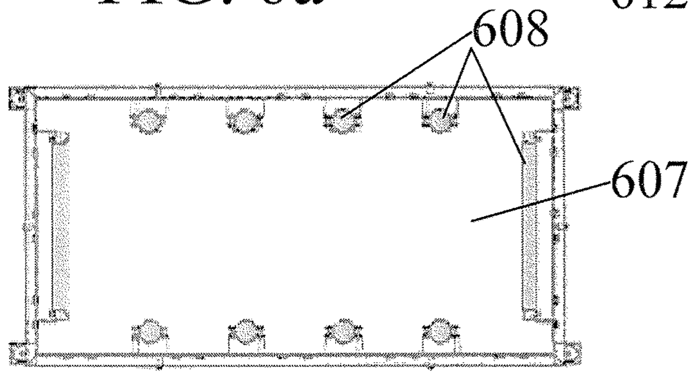
FIG. 6*b* is a top plan view of the alternative apparatus shown in FIG. 6*a*.
Figure 6C:
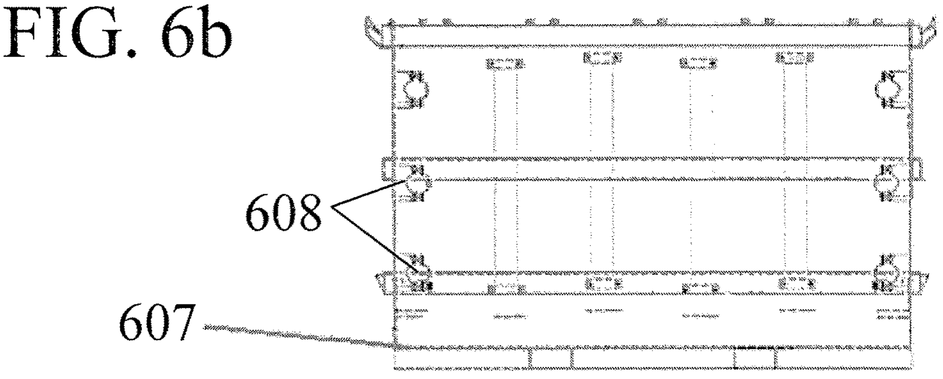
FIG. 6*c* is a side elevation view of the alternative apparatus shown in FIG. 6*a*.

FIG. 6*a*-6*c* shows a smaller example of the apparatus, built for the cleaning of smaller components, such as heat exchangers, valves, etc. The apparatus, generally indicated by reference numeral 600 in FIG. 6*a*, is comprised of a container formed of side walls 603 & 604, end walls 605 & 606 and bottom plate 607 with transducers 608 mounted vertically on the side walls and horizontally on the end walls 605 and 606. Because the volume of the container is significantly smaller than some of the larger examples, transducer spacing is not as important, and in this example, the transducers are mounted with approximately a 7 wavelength spacing, or approximately 17". The apparatus is preferably equipped with folding guard plates 609 which serve to protect the transducers and provide a conduit for the wiring needed to supply the transducers with the electrical energy required. The apparatus is further preferably equipped with a catwalk 610 held in place by struts 611, a drain plug 612 and skid tubes 613 for easy handling with a forklift. Lift lugs 614 are preferably provided to the container to be lifted as well as to sling components within the container during cleaning.

An electronic ultrasonic generator system is used to supply ultrasonic power (for example, in the form of alternating current at 25 kHz) to the transducers. A suitable electronic generator is available from Crest Ultrasonics Corp. located in Trenton, NJ The type of generator selected will depend on the preferences of the user and the requirements of the particular design. The transducers are connected to the generators via electrical wiring, which connects each transducer to an appropriate supply of electrical energy. In some examples, each transducer may require a generator to power it. In other examples, commercially available transducer/generator equipment may be used that allows more than one transducer to be supplied by a single generator. In some circumstances, only certain transducers may be active, such that there will be only certain areas of the tank that are actively cleaning components. In other circumstances, specialized tanks may only mount transducers in certain areas, such as to clean specific portions of components.

Figure 7:
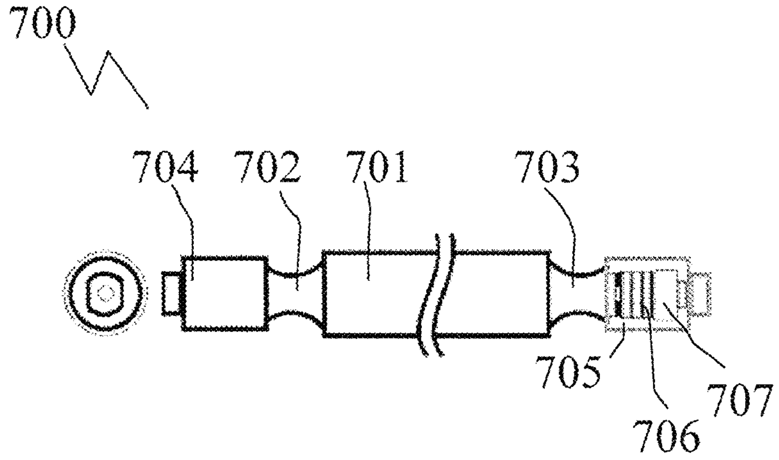
FIG. 7 depicts an example of a resonating rod style transducer.
Figure 8:
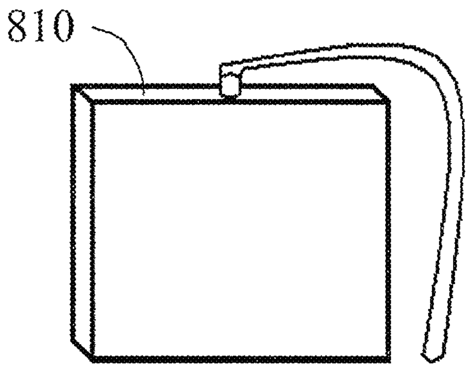
FIG. 8 depicts an example of a plate-type transducer.

FIG. 7 shows an example of a resonating rod ultrasonic transducer 700. The transducer 700 is has a resonating rod 701 attached by a coupling device 702 & 703 to so called "transducer heads" 704 & 705 which are comprised (internally) of a stack of piezoelectric crystals 706 connected electrically in series and backed with a counter weight/heat sink mass 707 which, under the influence of an alternating electrical voltage, will expand and contract, creating vibrations that are transmitted to the resonant rod 701 via the couplers 702 & 703. Each stack of piezoelectric crystal elements generally has specific resonant frequencies, some of which result in the radial expansion and contraction of the crystal, and some of which result in the axial (or thickness) expansion and contraction of the material. These typical rod transducers are generally operated at frequencies which are tuned to the resonant frequency of the system of crystal stacks and resonant rod. In the preferred examples described herein, the frequencies used are between 20 and 30 kHz, with 25 kHz being the normal operating frequency. Rod transducers may be mounted in a liquid tank in a vertical, horizontal, or diagonal orientation. As they are mounted in the tank, the spacing of these transducers is considered for the direction of propagation of ultrasonic waves. For example, with the rod transducers 701 shown in FIG. 7, relatively little energy propagates outward from the transducer heads 704 and 705. Thus, the spacing is measured in the radial direction, i.e. between parallel rods, rather than the axial direction, i.e. rods placed end to end. Other types of ultrasonic transducers are also commercially available and may be used in the examples described herein in suitable circumstances. For example, others types of transducers include single head resonant rod transducers, immersible plate style transducers (as shown in FIG. 8, represented by reference numeral 810), etc. Plate transducers are commercially available that may be bonded to the outside walls of the container, or may be fully enclosed and designed to be immersed. Accordingly, there are a variety of transducers that may be used to supply ultrasonic energy to the examples described herein. The design of the container and mounting of the transducers should be optimized for each style of transducer chosen to provide a uniform field of ultrasonic energy within the container.

Figure 9:
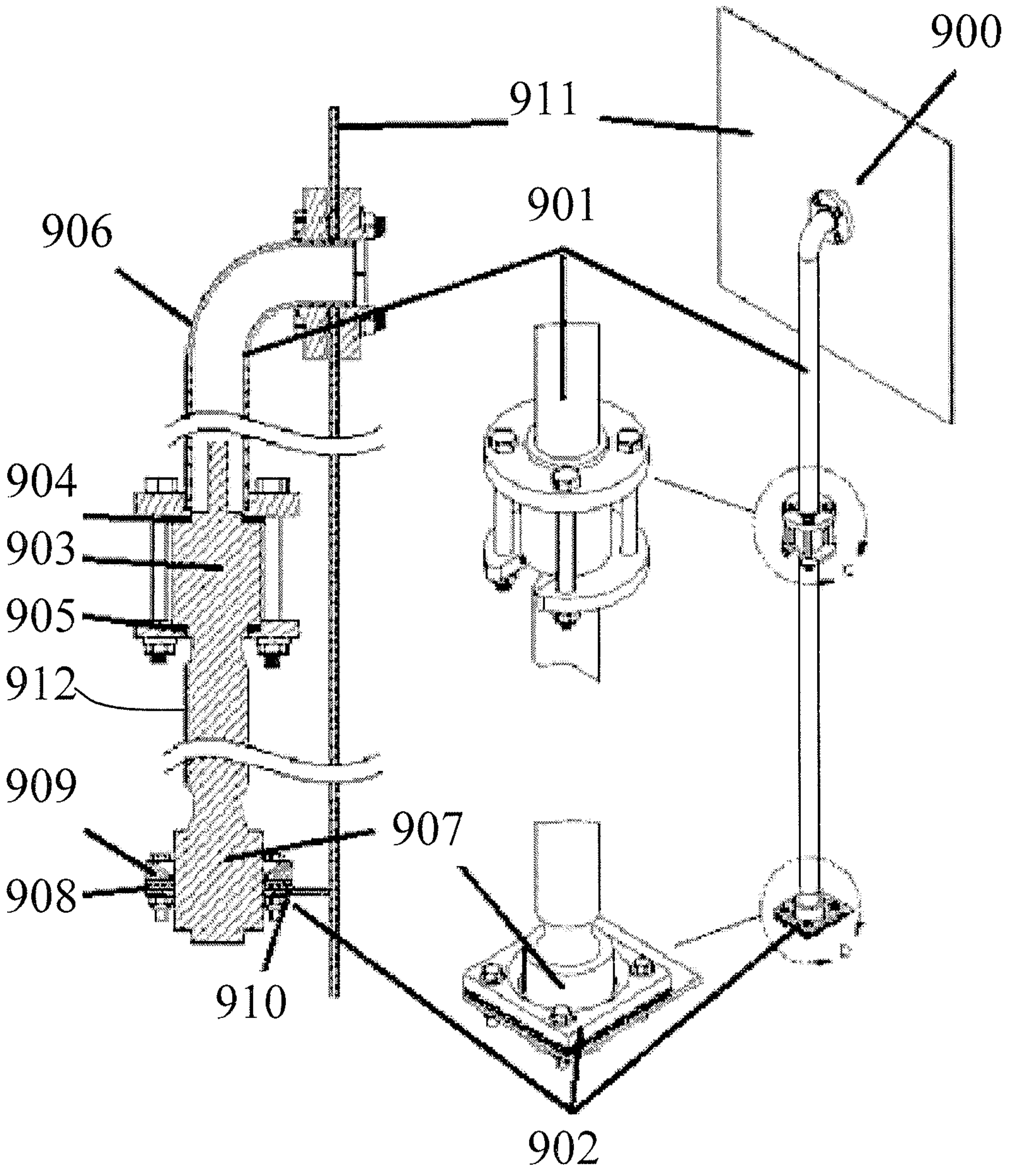
FIG. 9 is a side elevation view in section of a transducer mount that may be used to mount the transducers in the apparatus.

FIG. 9 shows an example of a transducer mount 900 that may be used in the apparatuses described herein. The mount 900 has a top mount 901 and a bottom mount 902 which secure the transducer 912 in place. The design incorporates a clamp for the top head of the transducer which clamps the head 903 gently between two gaskets 904 & 905, and the mount tube 906 supports the weight of the transducer in a vertical position. The bottom mount preferably does not secure the bottom head 907 of the transducer, rather it allows free vertical motion of the transducer for optimum vibrational output during operation, while at the same time restricting motion of the lower transducer head 907 in the horizontal plane by means of a compliant restraint gasket 908 sandwiched between a guide plate 909 and the mount plate 910, thus preventing damage from vibration or torque during shipment of the container. The top mount 901 is bolted to the container wall 911 for easy service removal and the bottom mount 902 is fixed to the container by weld or suitable fasteners.

Figure 10:
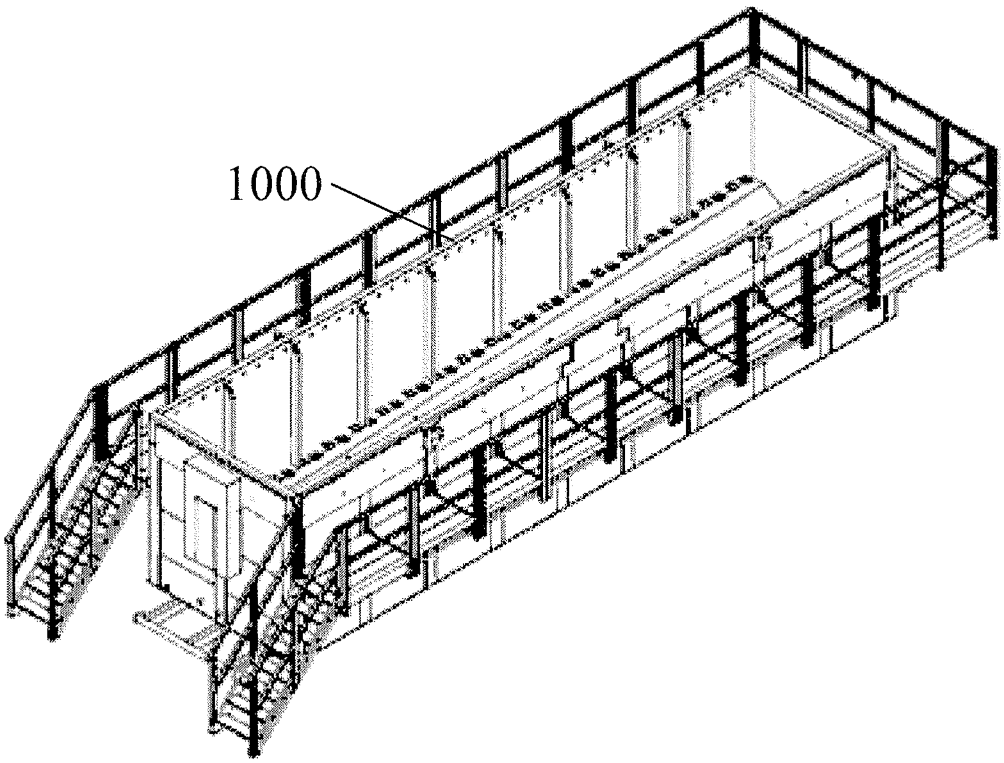
FIG. 10 is a perspective view of an alternative apparatus that is designed to clean industrial components up to a size of 6'×31'.

FIG. 10 shows an apparatus 1000 for cleaning industrial components which has been built to accommodate 6 foot wide by 31 foot long heat exchangers. This vessel is designed to incorporate the transducer mount shown in FIG. 9, using 86 dual head resonant rod transducers of the type described in FIG. 7.

What is claimed is:

1. An apparatus for cleaning industrial components, comprising:

a liquid container having a sidewall defining a liquid enclosure for containing a cleaning liquid; and ultrasonic transducers having an operating frequency and a wavelength in the cleaning liquid and secured to at least a portion of the liquid container at a spacing of between 2 and 6 wavelengths between adjacent ultrasonic transducers in a radial direction relative to an axis of the ultrasonic transducers, wherein:

the ultrasonic transducers operate at the same frequency;

the ultrasonic transducers are resonating rod transducers fixedly secured to an inner surface of the liquid container in a two dimensional plane, each ultrasonic transducer being secured by a compliant clamp and a mount device that does not restrict motion along an axis of the resonating rod transducer, the mount device having a compliant restraint gasket that restricts motion of the resonating rod transducer in a direction perpendicular to the axis; and the liquid container is sized and the ultrasonic transducers are spaced such that, in operation, the power distribution within the cleaning liquid comprises a component-cleaning area separated from the ultrasonic transducers by an area of interference in which ultrasonic waves from adjacent ultrasonic transducers interfere negatively to produce a non-uniform power distribution relative to the component-cleaning area.

2. The apparatus of claim 1, wherein the transducers generate a frequency between 20 KHz and 30 KHz.

3. The apparatus of claim 1, wherein the container is a liquid tank having an open top.

4. The apparatus of claim 1, wherein the container is a liquid tank sufficiently large to receive a set of heat exchanger tubes in the component-receiving area.

5. The apparatus of claim 4, wherein the set of heat exchanger tubes is between 2 feet and 150 feet in length and between 6 inches and 12 feet in diameter.

6. The apparatus of claim 1, wherein the transducers generate a power density within the liquid container when filled with liquid of between 10-60 Watts/gallon.

7. The apparatus of claim 1, wherein the transducers are mounted vertically, horizontally, or diagonally to the inner surface of the liquid container.

8. The apparatus of claim 1, wherein the component-cleaning area comprises less negative interference than in the area of negative interference such that ultrasonic waves retain more ultrasonic energy during propagation.

* * * * *